March 13, 1962 D. H. LAPOINTE 3,024,983

RECORD READER

Filed May 19, 1959 2 Sheets-Sheet 1

INVENTOR
DONALD H. LAPOINTE

March 13, 1962 D. H. LAPOINTE 3,024,983

RECORD READER

Filed May 19, 1959 2 Sheets-Sheet 2

INVENTOR
DONALD H. LAPOINTE

United States Patent Office 3,024,983
Patented Mar. 13, 1962

3,024,983
RECORD READER

Donald H. Lapointe, Meriden, Conn., assignor to Royal McBee Corporation, Port Chester, N.Y., a corporation of New York Filed May 19, 1959, Ser. No. 814,175
5 Claims. (Cl. 235—61.11)

This invention relates to an improved apparatus for sensing perforated records, and more particularly relates to a novel arrangement for a ball-type reader wherein the record sensing elements are intermittently yieldably biased towards the perforated record under varying amounts of force so as to insure a proper electrical contact with the adjacent portion of the reader frame when said record sensing elements respectively encounter a perforated portion of said record.

In conventional types of record readers which have movably mounted record sensing elements that make electrical contact with an adjacent portion of the reader frame, the said elements occasionally fail to initiate the necessary electrical output signal when a perforated hole in the record is encountered because there is insufficient contact pressure between said elements and said frame portion. Prior devices to overcome this difficulty have included means for exerting a relatively large constant biasing force against the record sensing elements, however this tends to adversely interfere with the record feeding operations.

One object of the instant invention is to provide a novel record reading apparatus whereby a yieldable biasing force is intermittently applied to the record sensing elements.

Another object of the invention is to provide an improved record reading device wherein a predetermined biasing force is applied to the record sensing elements only during the record sensing operations, and wherein said contact force is removed during the record feeding operations.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
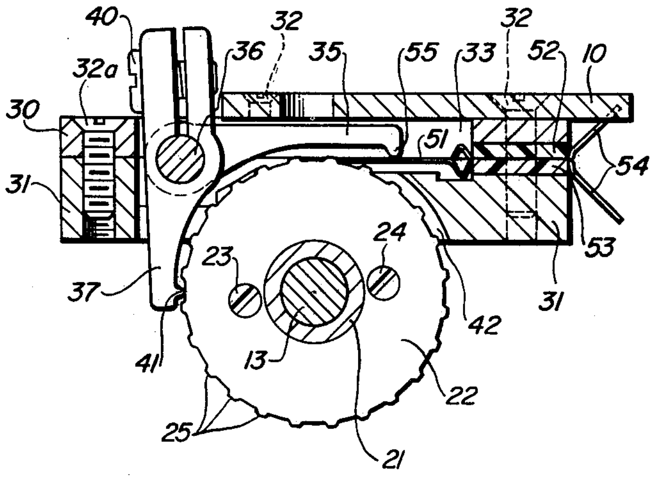
FIGURE 1 is a side elevational view in partial section taken along section line 1—1 of FIGURE 2.
Figure 3:
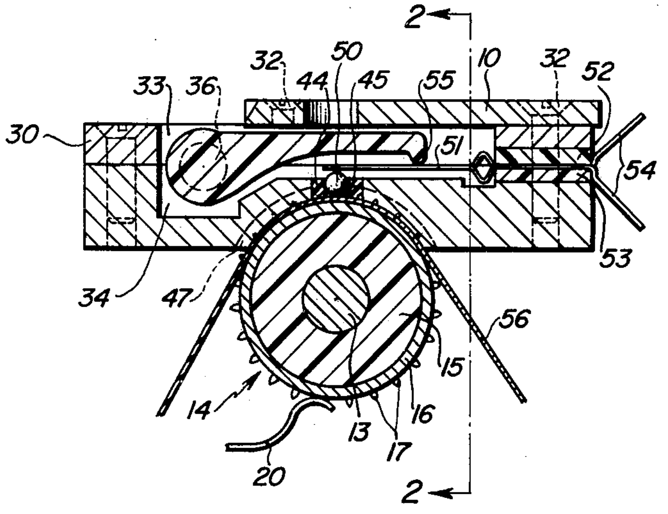
FIGURE 3 is a side elevational view in partial section taken along section line 3—3 of FIGURE 2.
Figure 2:
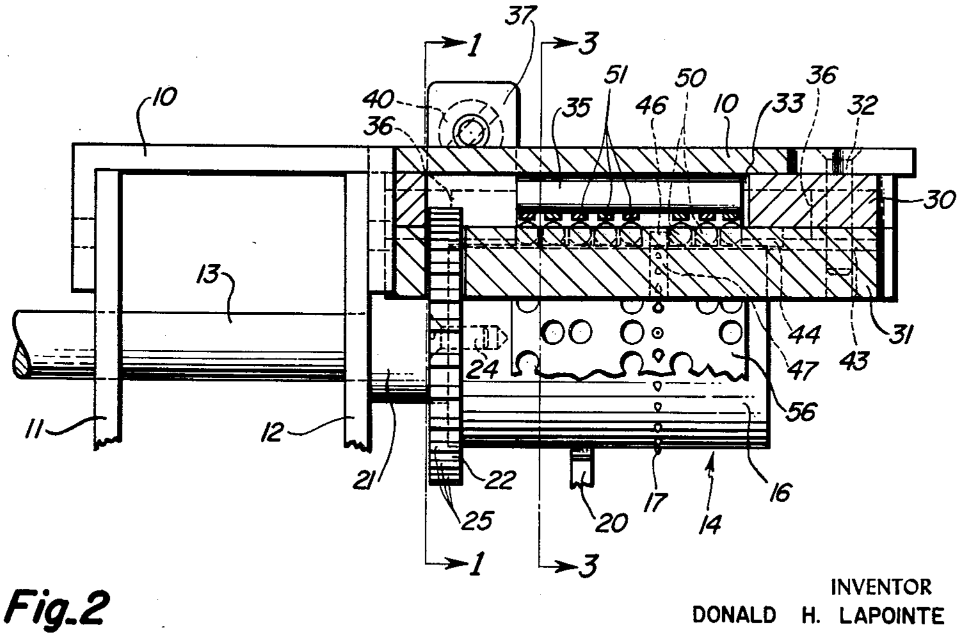
FIGURE 2 is a front elevational view in partial section taken along section line 2—2 of FIGURE 3.

Referring to FIGURES 1–3, the record reading device comprises a frame 10 having two depending arms 11 and 12 fixed thereto which rotatably support a shaft 13. Rotatably secured to the inner or right end of shaft 13 is a record feeding sprocket drum 14 which has a main non-conductive body portion 15 and an outer conductive portion 16, the latter being provided with the usual complement of circumferentially spaced teeth. A common contact brush 20 which is mounted on the reader frame by any suitable means is adapted to be biased into frictional contact with the cylindrical periphery of the drum 14 in the usual manner. The drum 14 is provided with a reduced spacing shoulder 21 on which is mounted a centrally apertured disk cam 22 which is secured to the main body of the drum 14 by means of screws 23, 24. The periphery of cam 22 is provided with a series of equally spaced circumferential disposed lobes 25; the diametral pitch of said lobes being the same as that for the said sprocket drum teeth 17.

A pair of co-operating housing body members 30 and 31 are secured to the frame 10 by means of screws 32, 32*a* etc. The upper body member 30 is formed with a contral aperture 33 while the lower member 31 is provided with a recess 34 which is generally co-extensive with said aperture 33. A non-conductive biasing arm 35 extends generally horizontally through the chamber co-operatively formed by said aperture 33 and recess 34 and is rotatably supported in members 30 and 31 by means of a integrally formed shaft 36. Also rotatably secured to shaft 36 is a depending cam follower arm 37 which is clamped on shaft 36 by means of a screw 40. The lower end of arm 37 is provided with nose 41 which is adapted to slidably engage the said contoured cam lobes 25. The bottom portion of the lower housing member 31 is formed with cylindrical recesses 42 and 43 which respectively receive and accommodate the upper portions of the cam 22 and record feed drum 14. The radial spacing between the outer cylindrical surfaces of the tape feed drum 14 and the cylindrical surfaces of the recess 43 is just sufficient to receive a perforated record therebetween. Fixedly mounted in the lower wall of the housing body member 31 is a non-conductive ball supporting block 44 which is formed with a plurality of spaced lateral aligned ball guiding holes 45. The block 44 and the body member 31 are respectively formed with co-extensive cylindrical recess 46 and 47 which receive and accommodate the said sprocket teeth 17 of the rotatable record feed drum 14. In each of the block recesses there is disposed a record sensing conductive element or ball 50 which is adapted to move into and out of electrical contact with the cylindrical surfaces of the outer conductive portion 16 of the record feed drum 14. The record sensing elements 50 are each normally lightly biased towards said drum 14 by means of a flexible cantilevered conductive contact 51 which is fixedly secured between a pair of non-conductive shims 52 and 53 that are in turn clamped between the adjacent surfaces of the housing body members 30 and 31 by the action of said screws 32. The outer ends 54 of said cantilevered contacts are each adapted to be connected to external electrical wiring for selectively completing a circuit with the common brush 20. The free end 55 of the contact biasing arm 35 overlies the upper surfaces of all the cantilever contacts 51.

Figure 4:
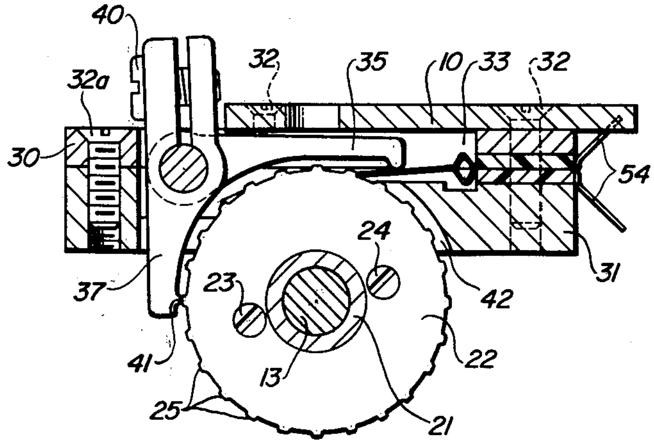
FIGURES 4 and 5 are side elevational active view of the apparatus shown in FIGURES 1 and 3 respectively.
Figure 5:
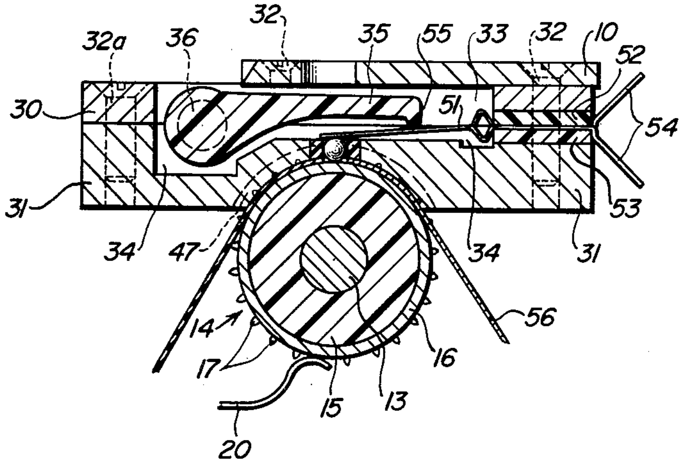

In operation the shaft 13 is intermittently rotated in either direction so as to serially present the successive transverse rows of holes in the record tape 56 to the sensing elements or balls 50. As each transverse row of record perforations is brought to the sensing position beneath balls 50, the rotation of shaft 13 is temporarily interrupted so as to permit the sensing elements 50 time enough to move into electrical contact with drum 14. Thereafter the rotation of shaft 13 is resumed so as to bring the next transverse row of record perforations to a reading position beneath said balls 50. It will be apparent that during the tape sensing operation it is desirable to have a relatively large biasing force exerted by the respective balls against the conductive surfaces of drum 14 and/or the tape 56 so that a sizable electrical contact pressure may be obtained therebetween. On the other hand it will be apparent that during the intermittent record feeding operations it is desirable to have a greatly reduced contact pressure between the balls 50 and the record tape 56 and/or the drum 14 so as to reduce the frictional drag on the tape being fed and to permit the balls 50 at this time to rotate at random thus bringing forth a new ball contact surface for the next sensing operation. These functional features are brought about in the instant apparatus by the co-operative action of said cam 22 and the related operated structure. Just prior to the time when the tape feeding drive is interrupted for a record sensing operation one of the cam lobes 25 will engage the nose 41 of the cam follower arm 37 so as to rotate the latter in a clockwise direction as shown in FIGURES 4 and 5. This action will cause the free end 55 of the biasing arm 35 to swing downwardly so as to depress the middle portions of all the cantilevered contacts 51 and thereby greatly increase the contact pressure between the balls 50 and the tape and/or outer surfaces of the feed drum 14. When the drum 14 is subsequently rotated to again incrementally feed the record tape the active cam lobe 25 will ride off the nose 41 and arms 37 and 35 will be rotated in a counterclockwise direction under the action of the flexible contacts 51 thereby relieving the relatively high contact pressures between said balls 50 and drum 14. This synchronized increasing and decreasing of the contact pressures will continue as long as the record tape is fed through the reading head.

By means of the instant arrangement the record tape 56 may be sensed while being fed in either longitudinal direction. Also the contact pressures of the sensing elements 50 may be advantageously varied to the desired extent depending on the shape of cam lobes 25; said pressure variations occurring in timed relation to the rotation of the record feed drum 14.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. In a record sensing device; a frame, a record feed drum rotatably mounted in said frame and adapted to advance a record through said device, a plurality of record sensing elements mounted in said frame and adapted to move into sensing engagement with said record, means for varying the amount of contact pressure between said elements and said drum, and means operated in timed relation to and in response to the rotation of said record feed drum for actuating the pressure varying means.

2. In a record reading device; a frame, means for feeding a perforated record through said device, record sensing means movably mounted on said frame and adapted to move into sensing engagement with said record, means for varying the amount of contact pressure of said elements against said record, and means for operating said pressure varying means in timed relation to the operation of said record feeding means.

3. A ball reader having a frame, a record feed drum rotatably mounted in said frame, a plurality of record sensing balls mounted in said frame and being movable into and out of contact with the periphery of said feed drum, cantilever contact means for normally lightly biasing said balls towards the periphery of said drum, movable means supported on said frame and operative on said contact means for varying the biasing force exerted on said balls by said contacts, and means for operating said movable means in timed relation to the rotation of said record feed drum.

4. A record reading device; comprising a frame, a record feeding drum rotatably mounted on said frame, a plurality of record sensing elements movably mounted in said frame, cam means mounted for movement with said drum, flexible cantilevered means mounted on said frame, the free ends of said cantilever means being engageable with said elements so as to normally lightly bias the latter towards the periphery of said drum, and means operated by said cam means and engaging said cantilever means for variably flexing the latter so as to vary the contact pressure between said elements and said drum periphery.

5. A record reading device; comprising a frame, a record feed drum rotatably mounted on said frame and adapted to feed a perforate record through said device, a plurality of record sensing elements mounted on said frame and adapted to move into and out of contact with the periphery of said drum, means for varying the amount of contact pressure between said record sensing elements and the drum periphery, and means operated in response to and in timed relation to the rotation of said drum for actuating the contact pressure varying means.

References Cited in the file of this patent

UNITED STATES PATENTS

| | | |
|---|---|---|
| 2,265,462 | Weitmann | Dec. 9, 1941 |
| 2,915,243 | Lapoint | Dec. 1, 1959 |